United States Patent
Chapman

(10) Patent No.: US 8,355,377 B2
(45) Date of Patent: Jan. 15, 2013

(54) METHOD OF SIGNALLING UPLINK INFORMATION

(75) Inventor: Thomas Malcolm Chapman, Bitterne (GB)

(73) Assignee: Nokia Siemens Networks Oy, Espoo (FI)

(*) Notice: Subject to any disclaimer, the term of this patent is extended or adjusted under 35 U.S.C. 154(b) by 1004 days.

(21) Appl. No.: 12/223,716

(22) PCT Filed: Jan. 16, 2007

(86) PCT No.: PCT/GB2007/050019
§ 371 (c)(1),
(2), (4) Date: Dec. 2, 2008

(87) PCT Pub. No.: WO2007/091101
PCT Pub. Date: Aug. 16, 2007

(65) Prior Publication Data
US 2009/0156226 A1   Jun. 18, 2009

(30) Foreign Application Priority Data
Feb. 7, 2006  (GB) .................................. 0602399.8

(51) Int. Cl.
*H04L 12/28* (2006.01)

(52) U.S. Cl. ......... 370/330; 370/443; 370/496; 455/450
(58) Field of Classification Search ................ 370/342, 370/341, 329, 281; 455/456, 439
See application file for complete search history.

(56) References Cited

U.S. PATENT DOCUMENTS

| 6,236,646 B1 * | 5/2001 | Beming et al. ................ 370/335 |
| 7,684,505 B2 * | 3/2010 | Rajagopal et al. ............ 375/265 |
| 2008/0165873 A1 * | 7/2008 | Ghosh et al. ................... 375/261 |

FOREIGN PATENT DOCUMENTS

| WO | 2004/042954 A1 | 5/2004 |
| WO | 2005/112486 A2 | 11/2005 |
| WO | 2005/125253 A1 | 12/2005 |

* cited by examiner

Primary Examiner — Kevin C Harper
Assistant Examiner — Henry Baron
(74) Attorney, Agent, or Firm — Staas & Halsey LLP

(57) ABSTRACT

A method of signaling on a downlink, information regarding scheduling resources allocated in uplink, is provided, wherein the information is contained in an uplink scheduling information message, which is formatted to contain a subset of content of any subsequent uplink scheduling information message in an ordered set of message formats. Each uplink scheduling information message selected from the set is punctured into a symbol of a downlink user data allocation.

16 Claims, 4 Drawing Sheets

METHOD OF SIGNALLING UPLINK INFORMATION

CROSS-REFERENCE TO RELATED APPLICATIONS

This application claims the benefit of British Application No. 0602399.8, filed on Feb. 7, 2006, and International Patent Application PCT/GB2007/050019, filed Jan. 16, 2007, the disclosure of which is incorporated herein by reference.

BACKGROUND

This invention relates to a method of signaling on a downlink, information regarding scheduling resources allocated in uplink. Single carrier frequency division multiple access (SC-FDMA) uplink for Universal Mobile Telecommunications System (UMTS) Terrestrial Radio Access Network (UTRAN) evolution is resource limited in the uplink from a terminal to a base station, unlike the 3<rd> generation partnership project (3GPP) wideband code division multiple access (WCDMA) standard. Thus, to accommodate a large number of users in SC-FDMA, or any other communication system similarly resource limited in the uplink, there must be a capability of scheduling resources in time and frequency between users. The scheduling may be sensitive to the uplink channel conditions for each user and to achieve long term evolution (LTE) performance requirements, it is preferable for the scheduling to be based at the Node B with a fast update rate. Uplink resource allocations need to be signaled to the terminal in a downlink from the base station to the terminal, in addition to uplink (UL) hybrid automatic repeat request (HARQ) information. Different terminals can have different bandwidths and be located in different parts of the spectrum, and the location of a downlink spectrum for each terminal is not necessarily related to an uplink spectrum that is scheduled for each terminal Thus, it is not necessarily possible to locate all of the scheduling information in the same place in time and frequency. Furthermore, different numbers of terminals might be scheduled at different times according to their bandwidth requirements.

SUMMARY

The inventors propose a method of signaling on a downlink, information regarding scheduling resources allocated in uplink; wherein the information is contained in an uplink scheduling information message; wherein each uplink scheduling information message is formatted to contain a subset of content of any subsequent uplink scheduling information message in an ordered set of messages; and wherein each uplink scheduling information message selected from the set is punctured into a symbol of a downlink user data allocation. An uplink message format requires a subset of the transmission resources required by the next format. A format is chosen from the set for transmission according to requirements. A terminal attempts to decode each possible format until it is successful, i.e. until the terminal has decoded the actually transmitted message, or until all formats in the set have been tried. An advantage is that there is no duplication of processing, since once the smallest subset has been decoded, that part does not need to be decoded again on the next attempt.

Preferably, the method further comprises setting the downlink bandwidth as an integer multiple of a sub-band set at a minimum terminal bandwidth. This caters for all types of terminal bandwidth.

Where there are sub-bands, preferably a message may be punctured into only one of those sub-bands, but alternatively, each uplink scheduling information message is punctured into a symbol of a downlink user data allocation in more than one sub-band.

Preferably, the uplink scheduling information message is transmitted in one of the sub-bands in which the user receives its downlink.

Preferably, a minimum uplink scheduling information message content comprises hybrid automatic repeat request bits and a cyclic redundancy check. Preferably, each subsequent uplink scheduling information message in the sequence comprises an additional user identifier and associated uplink scheduling data. Preferably, a number of tones in a symbol of a downlink user data allocation to be punctured is set for a maximum size uplink scheduling information message in the set; and each preceding message in the set utilizes a subset of the number of tones. Preferably, a location of a sub-band in a downlink spectrum containing uplink scheduling information for a terminal indicates a relative position of uplink resources in an uplink spectrum of that terminal.

The method may be applied to various communication systems, but preferably, the method is applicable for use in a UTRAN LTE system. In accordance with a second aspect, a method of decoding uplink scheduling information signaled on a downlink comprises decoding the minimum information content and checking for uplink scheduling information by applying a cyclic redundancy check; and thereafter decoding and checking each subsequent information message until all information messages formats in the set have been decoded and checked.

Preferably, a Viterbi algorithm is applied one at a time to each of the uplink scheduling information message formats in the set to generate predecessor tables and accumulated metrics; wherein the generated tables and metrics for each format are stored; and wherein the uplink scheduling information messages in a sequence are decoded using the stored tables for preceding formats.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF EMBODIMENTS

Figure 1:
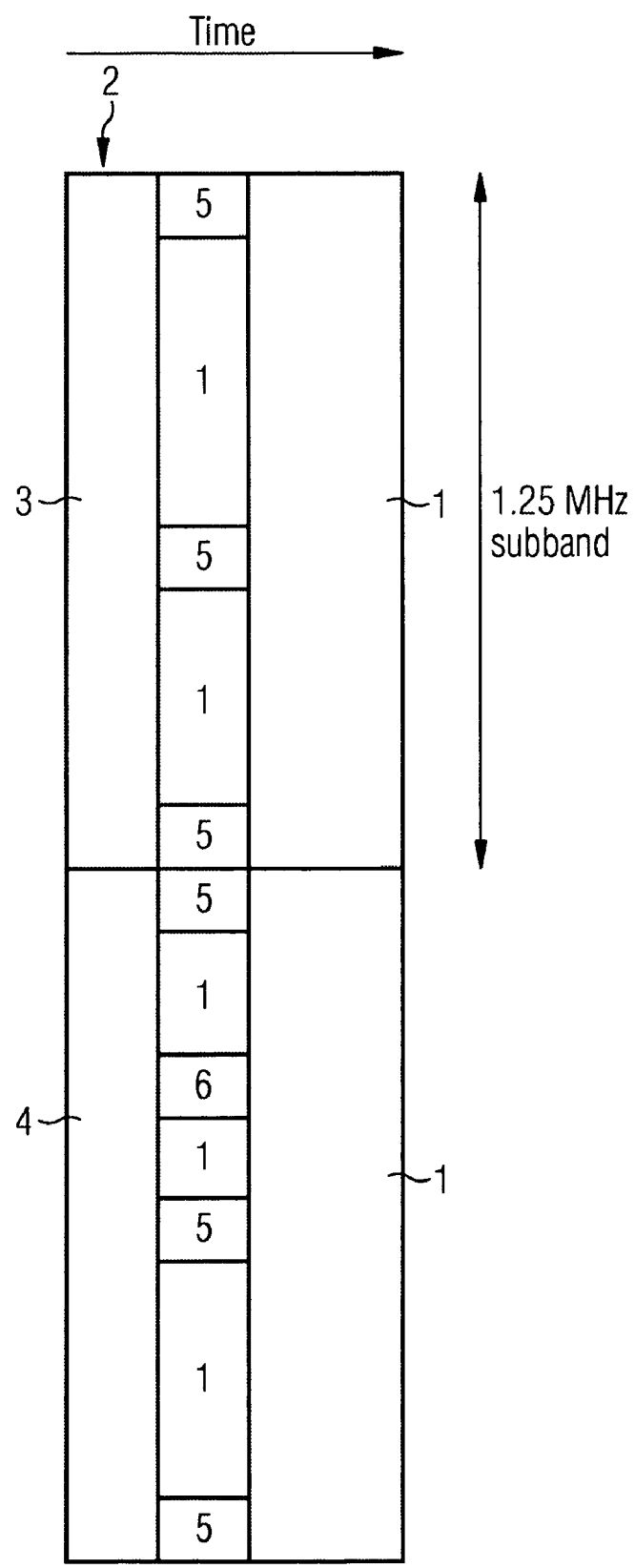
FIG. 1 illustrates a first example of resource allocation in accordance with one potential embodiment of the proposed method.

Reference will now be made in detail to the embodiments, examples of which are illustrated in the accompanying drawings, wherein like reference numerals refer to the like elements throughout. The embodiments are described below to explain the present invention by referring to the figures.

To date, the issue of UL scheduling in UTRAN LTE has not been addressed. In comparable systems, such as in worldwide interoperability for microwave access (WiMAX) the location and size of DL signaling for UL scheduling is indicated in the downlink resource allocation. However, this necessitates additional resource allocation signaling and becomes more complex considering multiple terminal bandwidth configurations. Flash orthogonal frequency division multiplexing (OFDM) carries UL and DL scheduling information and UL ARQ information in the same physical channel and 1 to 2 slots in advance. Thus, the disadvantage with the WiMAX approach is additional signaling, whilst it is not clear that the Flarion approach leads to an optimization of latency and use of air interface resources.

In UTRAN LTE a sub-frame structure in the downlink has 7 OFDM symbols. It is assumed, for the purpose of this description, that the first DL symbol contains pilots and DL scheduling information, although this is not necessarily always the case. Information relating to UL scheduling includes some or all of the following: a terminal, or user equipment (UE) identifier (ID), indicating the identity of the terminal that is to be scheduled, if necessary, a location of the scheduled resource; if necessary, a number of scheduled resources; if useful, a duration of the scheduled resource; and HARQ acknowledgement/no acknowledgment (ACK/NACK) indicators.

Information on the number and amount of scheduled resources is not needed if a terminal is simply given the whole of its bandwidth. It is assumed that the HARQ ACK/NACKs relate to previous UL transmissions, and terminals for which they are intended are aware of the fact that they should receive an ACK/NACK from the timing of their original transmission and the position in the list that their ID had when the scheduling allocation was made. In the proposed method, scheduling information is transmitted in a bandwidth equivalent to the minimum terminal bandwidth. For the purpose of this example, this is assumed to be 1.25 MHz, but clearly this value depends upon the system in question. In this way, every terminal is able to read scheduling information. If a base station has a spectrum larger than the 1.25 MHz minimum bandwidth, then UL scheduling information relating to 1.25 MHz users needs to be transmitted in the 1.25 MHz band within which the user receives his downlink. For larger bandwidth users, the UL scheduling information can be transmitted in any 1.25 MHz sub-band of the bandwidth received by the user. For example, the UL scheduling information can be transmitted in a band for which the user has good downlink reception, or alternatively, the relative position of the signaling within the user's downlink spectrum is used to indicate the relative position of the uplink allocation within the user's uplink spectrum.

The UL scheduling information is punctured into the downlink data allocation in the second or subsequent OFDM symbol. It is preferred that the scheduling information is kept out of the symbol containing downlink signaling and pilots, although the UL scheduling information can be punctured into any known place. The UL scheduling information is scalable, in that each message contains a minimum amount of information and the next message contains that same information plus an incremental addition. One example of this is set out below. The minimum message is when no information is provided, but as this is not particularly useful; the minimum message format (A) for this example contains HARQ bits and a cyclic redundancy check which are punctured into the second symbol. The base station, or Node B transmits some ACK/NACKs relating to previous UE transmissions but does not schedule any UEs using this. The next message format (B) contains a first terminal ID (UEIDI) and whatever other information (Aux1) has been deemed necessary or useful such as resource location, number and duration. In the next message format (C), this is incremented by the addition of a second terminal ID (UEID2) and associated information (Aux2) and so on. For this example, there are only four message formats (A to D), but the total number in any situation will depend upon the number of UE's for which there is scheduling information. A: HARQ Bits+CRC, B: UEIDI+Aux1+HARQ Bits+CRC, C:UEID1+Aux1+UEID2+Aux2+HARQ Bits+CRC D:UEID1+Aux1+UEID2+Aux2+UEID3+Aux3+HARQ Bits+CRC Etc.

The number of HARQ ACK/NACK bits transmitted is assumed to be fixed as a number equivalent to the maximum amount of terminals that could have been previously scheduled. The terminals know which HARQ ACK/NACK bit to look for from a timing relationship and from their position in the list of scheduled terminals in the scheduling command.

When the UL scheduling information is punctured into the DL data, it uses a subset of N known tones, where N relates to the maximum size of the UL scheduling message, so scenario A uses the first NA of these tones, scenario B uses the first NB tones where NB>NA, scenario C uses the first Nc tones, where NC>NB and so on.

During decoding each terminal first tries to decode assuming scenario A, then scenario B, then C and so on. If a CRC passes, it is assumed that UL scheduling information is present and the UE checks for its ID to see if the scheduling information is directed to that UE. If the CRC does not pass for any of the scenarios, it is assumed that no scheduling or HARQ information has been transmitted in the DL in this band. Any user that actually has DL data also detects the UL scheduling and punctures his data allocation according to the scheduling allocation he has detected.

Figure 2:
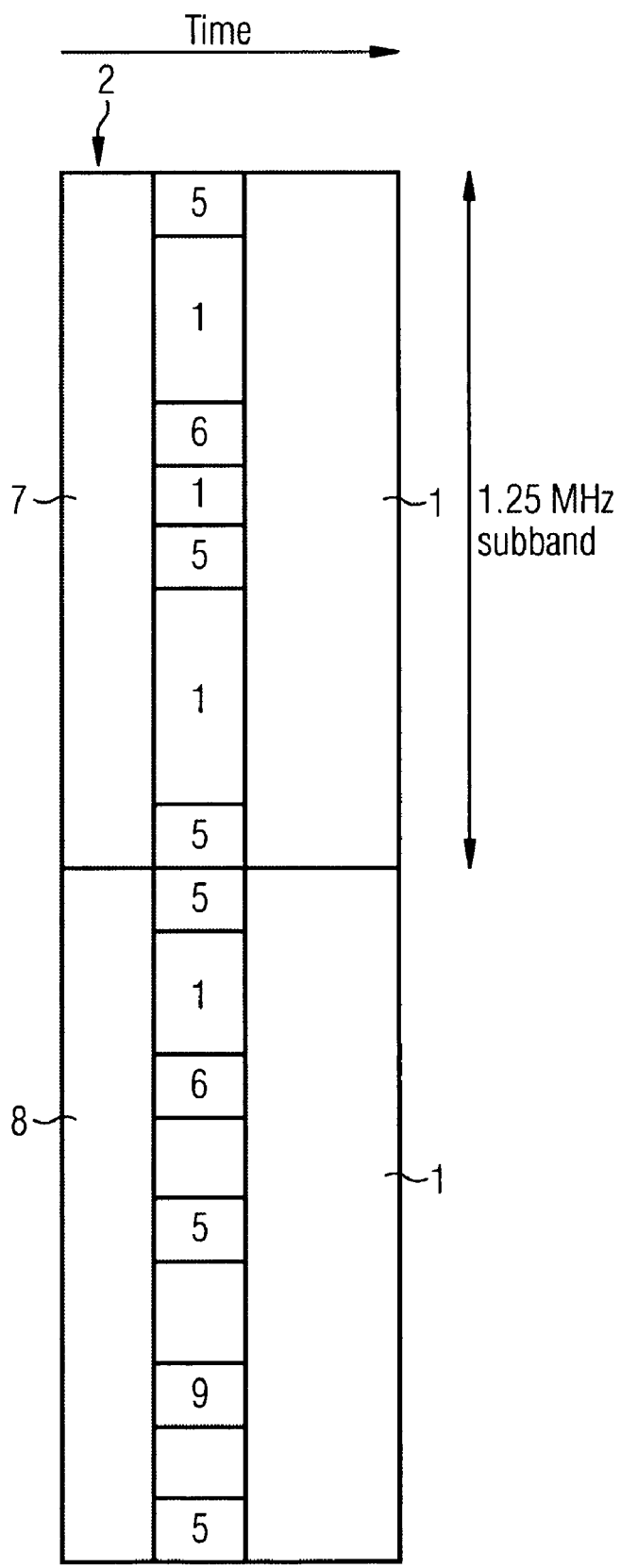
FIG. 2 illustrates a second example of resource allocation in accordance with one potential embodiment of the proposed method.
Figure 3:
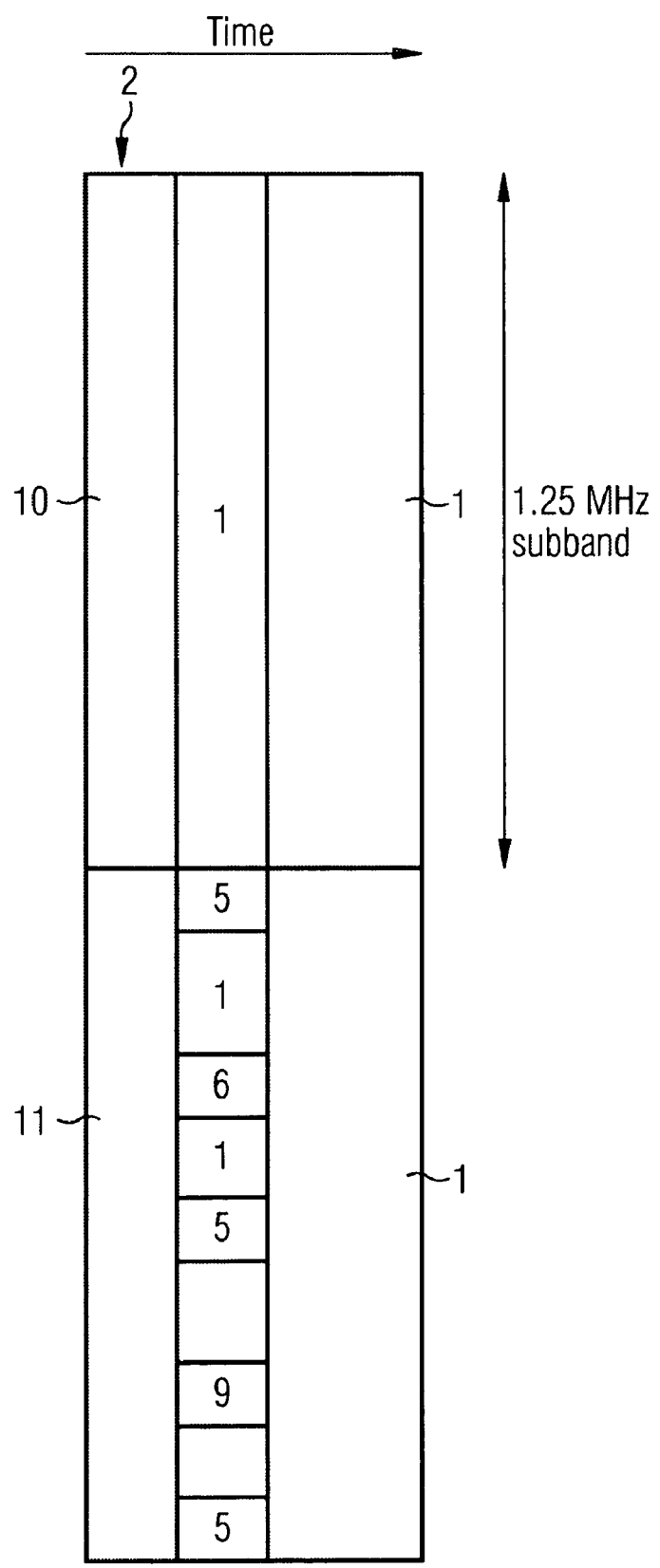
FIG. 3 illustrates a third example of resource allocation in accordance with one potential embodiment of the proposed method; and, FIG. 4 is a flow diagram of a method of improving efficiency of the proposed method.

Specific examples of signaling UL resource allocation in the downlink are shown in FIGS. 1 to 3. In FIG. 1 user data 1 is provided in all but a first symbol 2. This first OFDM symbol contains downlink signaling and pilots. In a first 1.25 MHz sub-band 3, UL Signaling format "A" is used, i.e. only HARQ ACK/NACK bits are transmitted in this band and these are punctured into the user data tones in positions 5. In a second 1.25 MHz sub-band 4, format "B" is used, i.e. HARQ ACK/NACK bits and one set of UL scheduling information is sent in this band. The UL scheduling information needs an additional tone 6 and it can be seen that the tones 5, 6 within the 1.25 MHz band 4 for format "B" are a subset of those tones 5 used for format "A" In FIG. 2 user data 1 is punctured according to the format used. In sub-band 7, UL signaling format "B" is used, i.e. HARQ ACK/NACK bits 5 and UL scheduling information 6 for one UE are transmitted in this band. In sub-band 8, format "C" is used, so HARQ ACK/NACK bits 5 and UL scheduling information for two UEs are sent in this band. The first UE data in tone 6 and the second UE data in tone 9. It can be seen that the tones within a 1.25 MHz band for format "C" are a subset of those used for format "B".

In FIG. 3 a third example of signaling resource allocation is shown. Areas 1 show user data and in sub-band 10, no UL scheduling or HARQ information is transmitted, so no symbols are punctured from the user data. In sub-band 11, format "C" is used, so HARQ ACK/NACK bits 5 and UL scheduling information 6, 9 for two UEs are sent in this band.

If convolutional coding is used, the complexity of a Viterbi decoding of the set of scenarios can be reduced, as described below. A problem with the method described above is that some degree of blind detection of signaling by a terminal is required. The blind detection is carried out by attempting to decode a number of potential signaling formats or locations and then checking the CRC to see whether information was indeed present. The use of blind signaling detection enables an optimized signaling format that is power and bandwidth efficient. However, potentially such blind detection represents a non insignificant complexity to the terminal, which has to decode the signaling in the minimum possible time in order to maintain low latency. Therefore, the method provides a methodology for adapting a standard Viterbi decoding algorithm in order to mitigate the potential complexity increase caused by the blind detection of the signaling. This implementation brings advantages by reducing complexity for the terminal.

The signaling may take one of a number of formats. However, if the formats are labeled x=1 . . . X, the sub-carriers used for format x−1 always includes a subset made up of the first Y sub-carriers of format x, where Y is dependent on the format x−1. Consider decoding formats x=1 . . . X. At stage 1, the preceding states table and accumulated metrics table is calculated. The decoding is completed. If format 1 did not produce a valid CRC, then at stage 2 the preceding states table from stage 1 is taken together with the accumulated metrics for each possible end state and the Viterbi decoding is simply continued from the symbol that marked the end of the possible stage 1. Thus no duplication of add/compare/select operations is carried out.

Figure 4:
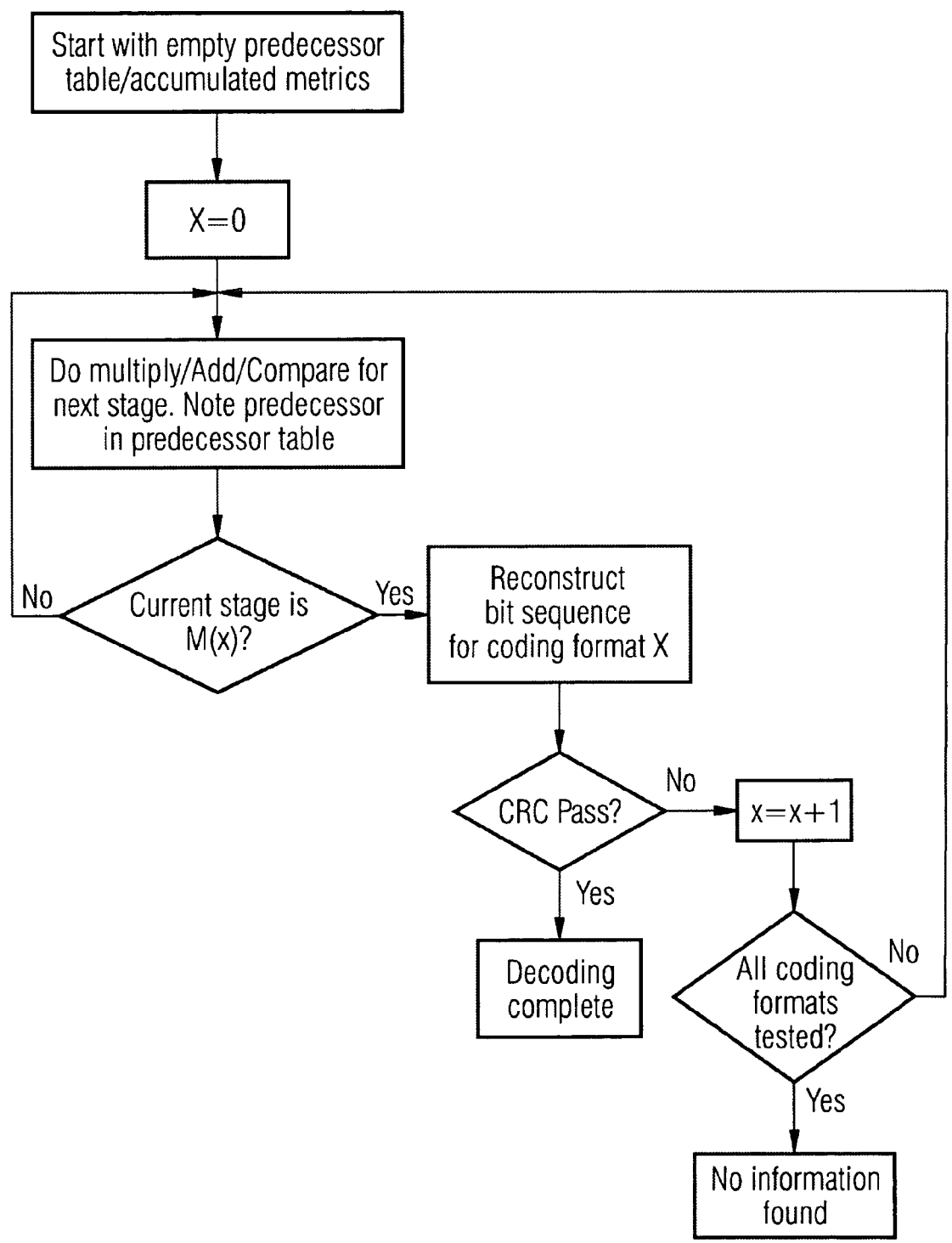

FIG. 4 is a flowchart showing reduced complexity decoding in the case of a set of transport formats x=1, 2, . . . X for which the format, x−1 includes the first M(x−1) symbols of format x. Starting from an empty predecessor table and accumulated metrics at X=0, a multiply/add/compare is carried out for the next stage and a predecessor is noted in the predecessor table. For a current stage M(x), a bit sequence for a coding format x is reconstructed and a CRC check carried out. If the CRC check passes, then decoding is complete. If the CRC check does not pass, then x is incremented to become x+1 and if all formats have been tested, then it is deemed that no information has been found. If not all formats have been tested, then reconstruction and checking continues.

The proposed method addresses the need for DL signaling for UL scheduling to be both efficient and flexible to accommodate terminals of varying bandwidths in varying parts of the downlink spectrum by a flexible scheme based on partitioning the downlink into the lowest terminal bandwidth variant.

There are a number of advantages in the method including the ability to scale the amount of HARQ ACK/NACK and UL scheduling signaling dynamically, according to the scheduling requirement. There is no need to specifically reserve resources only for UL scheduling and the UL scheduling can be managed for terminals of multiple bandwidth By transmitting signaling in which there are a number of signaling formats, for which each format is a subset of the next format in the sequence, a terminal can decode the formats one at a time and check, using a CRC, whether a format has been used or not. A further subdivision into sub-bands of the available spectrum for signaling is possible. Each sub-band is treated separately and a terminal that can receive multiple sub-bands searches for scheduling information in all of the sub-bands. The location of the sub-band containing signaling for uplink scheduling within a users downlink spectrum may indicate the relative position of the allocated uplink resources within the user's uplink spectrum.

A set of possible decoding formats is structured such that each format is made of an alternative structuring of other formats, or is a subset of the first N symbols of at least one other format. A modified Viterbi decoding algorithm is applied, which stores sets of intermediate preceding state tables and accumulated metrics for each possible coder state relating to blocks of symbols that are to be decoded, in order that a combination of these sets of tables enables decoding of all of the formats without repetition of the add/compare/select operation of the Viterbi algorithm The number of intermediate states can be reduced when considering fractions of a decoding format, by limiting to states predicted as most likely from the prior sections of each decoding format, in order to reduce the storage space. The signaling format may be made up of full, half or third chunks in an OFDM system.

Although a few embodiments have been shown and described, it would be appreciated by those skilled in the art that changes may be made in these embodiments without departing from the principles and spirit of the invention, the scope of which is defined in the claims and their equivalents.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method of signaling, comprising:
   forming an ordered set of uplink scheduling information messages, each uplink scheduling information message being formatted to contain a subset of content of any subsequent uplink scheduling information message, such that the order in the ordered set determines the content of each uplink scheduling information message relative to preceding and subsequent uplink scheduling information messages;
   puncturing each uplink scheduling information message into a symbol of a downlink user data allocation; and
   transmitting from a device to a user, the downlink user data allocation, the uplink scheduling information messages being sequentially transmitted as part of the downlink user data allocation.

2. The method according to claim 1, further comprising setting a downlink bandwidth as an integer multiple of a sub-band set to a minimum terminal bandwidth.

3. The method according to claim 2, wherein each uplink scheduling information message is punctured into a symbol of the downlink user data allocation in more than one sub-band.

4. The method according to claim 2, wherein each uplink scheduling information message is transmitted in one of the sub-bands in which the user receives its downlink.

5. The method according to claim 1, wherein
   a first uplink scheduling message contains a minimum content, and
   the minimum content comprises hybrid automatic repeat request bits and a cyclic redundancy check.

6. The method according to claim 1, wherein each uplink scheduling information message subsequent to a first uplink scheduling information message comprises an additional user identifier and associated uplink scheduling data.

7. The method according to claim 1, wherein
   the symbol into which each uplink scheduling information message is to be punctured contains a plurality of tones,
   the method further comprises:
      setting a maximum number of tones in the symbol based on a maximum size required to transmit a largest uplink scheduling information message in the set; and
      using a subset of the maximum number of tones for each uplink scheduling information message preceding the largest uplink scheduling information message.

8. The method according to claim 2, wherein
the uplink scheduling information messages are transmitted in a sub-band of a downlink spectrum,
the uplink scheduling information messages schedule resources in an uplink spectrum, and
a location of the sub-band of the downlink spectrum indicates a relative position of the resources in the uplink spectrum.

9. The method according to claim 1, for use in a UTRAN LTE system.

10. The method according to claim 4, wherein
a first uplink scheduling message contains a minimum content, and
the minimum content comprises hybrid automatic repeat request bits and a cyclic redundancy check.

11. The method according to claim 10, wherein each uplink scheduling information message subsequent to the first uplink scheduling information message comprises an additional user identifier and associated uplink scheduling data.

12. The method according to claim 11, wherein
the symbol into which each uplink scheduling information message is to be punctured contains a plurality of tones,
the method further comprises:
    setting a maximum number of tones in the symbol based on a maximum size required to transmit a largest uplink scheduling information message in the set; and
    using a subset of the maximum number of tones for each uplink scheduling information message preceding the largest uplink scheduling information message.

13. The method according to claim 12, wherein
the uplink scheduling information messages are transmitted in a sub-band of a downlink spectrum,
the uplink scheduling information messages schedule resources in an uplink spectrum, and
a location of the sub-band of the downlink spectrum indicates a relative position of the resources in the uplink spectrum.

14. The method according to claim 13, for use in a UTRAN LTE system.

15. A method of decoding uplink scheduling information signaled on a downlink, comprising:
    receiving at a device via a downlink, an ordered set of uplink scheduling information messages, each uplink scheduling information message being formatted to contain a subset of information content of any subsequent uplink scheduling information message in the ordered set;
    decoding a minimum information content which comprises hybrid automatic repeat request bits and cyclic redundancy check information, in a first-decoded scheduling information message and checking for uplink scheduling information by applying a cyclic redundancy check; and
    after decoding the minimum information content, decoding and checking each subsequent information message until all information messages in the set have been decoded and checked.

16. A method according to claim 15, wherein
there are a plurality of formats for the uplink scheduling information messages,
a Viterbi algorithm is separately applied to each uplink scheduling information message format for the uplink scheduling information messages in the set to generate a table and accumulated metrics,
the table and accumulated metrics contain information regarding a format used in a predecessor uplink scheduling information message, and
the tables and accumulated metrics are stored, and
the uplink scheduling information messages in the set are decoded using information from the table regarding the format used in the predecessor message.

* * * * *